United States Patent
Chauvel et al.

(10) Patent No.: US 8,429,383 B2
(45) Date of Patent: Apr. 23, 2013

(54) MULTI-PROCESSOR COMPUTING SYSTEM HAVING A JAVA STACK MACHINE AND A RISC-BASED PROCESSOR

(75) Inventors: Gerard Chauvel, Antibes (FR); Serge Lasserre, Frejus (FR); Maija Kuusela, Mouans Sartoux (FR); Dominique D'Inverno, Villeneuve Loubet (FR)

(73) Assignee: Texas Instruments Incorporated, Dallas, TX (US)

( * ) Notice: Subject to any disclaimer, the term of this patent is extended or adjusted under 35 U.S.C. 154(b) by 1990 days.

(21) Appl. No.: 10/631,939

(22) Filed: Jul. 31, 2003

(65) Prior Publication Data

US 2004/0078550 A1 Apr. 22, 2004

Related U.S. Application Data

(60) Provisional application No. 60/400,391, filed on Jul. 31, 2002.

(30) Foreign Application Priority Data

Jul. 30, 2003 (EP) .................................. 03291927

(51) Int. Cl.
*G06F 15/76* (2006.01)
(52) U.S. Cl.
USPC .......................................................... 712/34
(58) Field of Classification Search .......................... None
See application file for complete search history.

(56) References Cited

U.S. PATENT DOCUMENTS

| | | | |
|---|---|---|---|
| 5,226,127 A | 7/1993 | Fu et al. | |
| 5,951,689 A * | 9/1999 | Evoy et al. | 713/322 |
| 5,953,741 A * | 9/1999 | Evoy et al. | 711/132 |
| 6,009,499 A * | 12/1999 | Koppala | 711/132 |
| 6,009,509 A * | 12/1999 | Leung et al. | 712/202 |
| 6,088,786 A * | 7/2000 | Feierbach et al. | 712/200 |
| 6,098,089 A | 8/2000 | O'Connor et al. | 709/104 |
| 6,205,578 B1 * | 3/2001 | Grove | 717/118 |
| 6,330,659 B1 * | 12/2001 | Poff et al. | 712/34 |
| 6,549,961 B1 * | 4/2003 | Kloth | 710/36 |
| 6,567,905 B2 | 5/2003 | Otis | 711/170 |
| 6,571,260 B1 | 5/2003 | Morris | 707/206 |
| 6,606,743 B1 * | 8/2003 | Raz et al. | 717/148 |
| 6,775,763 B2 * | 8/2004 | Sexton et al. | 712/227 |
| 6,826,749 B2 * | 11/2004 | Patel et al. | 717/148 |
| 6,954,873 B2 * | 10/2005 | Jain | 713/500 |
| 6,965,984 B2 * | 11/2005 | Seal et al. | 712/209 |
| 2002/0013872 A1 | 1/2002 | Yamada | |

(Continued)

FOREIGN PATENT DOCUMENTS

| | | |
|---|---|---|
| EP | 0 230 353 A2 | 7/1987 |
| EP | 0 230 353 A3 | 7/1987 |

*Primary Examiner* — Jacob A Petranek
(74) *Attorney, Agent, or Firm* — Ronald O. Neerings; Wade James Brady, III; Frederick J. Telecky, Jr.

(57) ABSTRACT

A system comprises a first processor, a second processor coupled to the first processor, memory coupled to, and shared by, the first and second processors, and a synchronization unit coupled to the first and second processors. The second processor preferably comprises stack storage that resides in the core of the second processor. Further, the second processor executes stack-based instructions while the first processor executes one or more tasks including, for example, managing the memory via an operating system that executes only on the first processor. Associated methods are also disclosed.

14 Claims, 6 Drawing Sheets

U.S. PATENT DOCUMENTS

2002/0065990 A1 5/2002 Chauvel et al. ............... 711/137
2002/0069332 A1 6/2002 Chauvel et al. ............... 711/144
2002/0095562 A1 7/2002 Nakanishi et al.
2002/0184479 A1 12/2002 Sexton et al.
2003/0101320 A1 5/2003 Chauvel et al. ............... 711/154

* cited by examiner

| R0 | GENERAL PURPOSE (GP) |
|---|---|
| R1 | GENERAL PURPOSE (GP) |
| R2 | GENERAL PURPOSE (GP) |
| R3 | GENERAL PURPOSE (GP) |
| R4 | PROGRAM COUNTER (PC) |
| R5 | GENERAL PURPOSE/LOCAL VARIABLE POINTER (LV) |
| R6 | STACK POINTER (SP) |
| R7 | TOP OF STACK (ToS) |
| R8 | GENERAL PURPOSE/ADDRESS INDEX 0 (AI0) |
| R9 | GENERAL PURPOSE/ADDRESS INDEX 1 (AI1) |
| R10 | GENERAL PURPOSE (GP) |
| R11 | GENERAL PURPOSE (GP) |
| R12 | MICRO-PROGRAM COUNTER (MICRO-PC) |
| R13 | GENERAL PURPOSE (GP) |
| R14 | GENERAL PURPOSE/INDIRECT REGISTER INDEX (IRI) |
| R15 | STATUS AND CONTROL (ST) |

*FIG. 4*

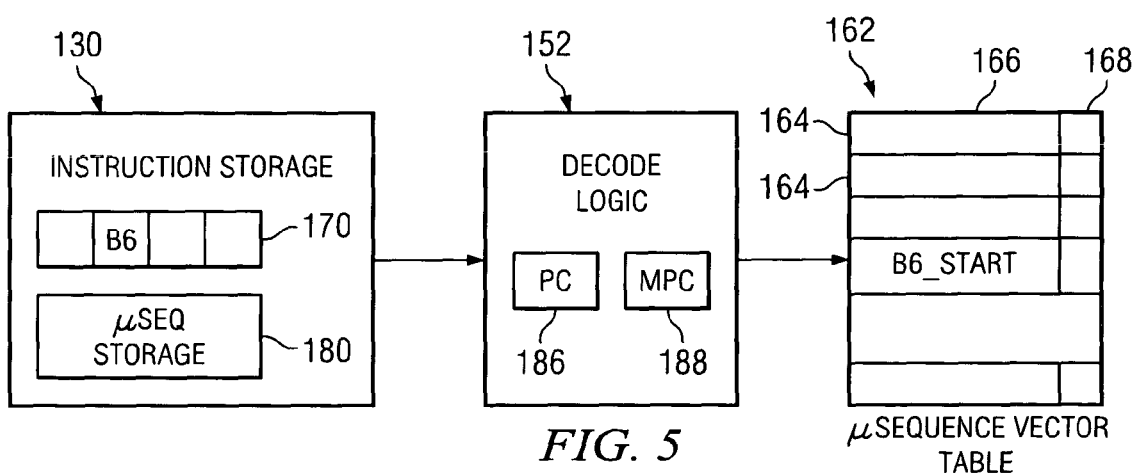

*FIG. 5*

MULTI-PROCESSOR COMPUTING SYSTEM HAVING A JAVA STACK MACHINE AND A RISC-BASED PROCESSOR

CROSS-REFERENCE TO RELATED APPLICATIONS

This application claims priority to U.S. Provisional Application Ser. No. 60/400,391 titled "JSM Protection," filed Jul 31, 2002, incorporated herein by reference. This application also claims priority to EPO Application No. 03291927.6, filed Jul. 30, 2003 and entitled "A Multi-Processor Computing System Having A Java Stack Machine And A RISC-Based Processor," incorporated herein by reference. This application also may contain subject matter that may relate to the following commonly assigned co-pending applications incorporated herein by reference: "System And Method To Automatically Stack And Unstack Java Local Variables," Ser. No, 10/632,228, filed Jul. 31, 2003, "Memory Management Of Local Variables," Ser. No. 10/632,067, filed Jul. 31, 2003, "Memory Management Of Local Variables Upon A Change Of Context," Ser. No. 10/632,076, filed Jul. 31, 2003, "A Processor With A Split Stack," Ser. No. 10/632,079, filed Jul. 31, 2003, "Using IMPDEP2 For System Commands Related To Java Accelerator Hardware," Ser. No. 10/632,069, filed Jul. 31, 2003, "Test With Immediate And Skip Processor Instruction," Ser. No. 10/632,214, filed Jul. 31, 2003, "Test And Skip Processor Instruction Having At Least One Register Operand," Ser. No. 10/632,084, filed Jul. 31, 2003, "Synchronizing Stack Storage," Ser. No, 10/631,422, filed Jul. 31, 2003, "Methods And Apparatuses For Managing Memory," Ser. No. 10/631,252, filed Jul. 31, 2003, "Write Back Policy For Memory," Ser. No. 10/631,185, filed Jul. 31, 2003, "Methods And Apparatuses For Managing Memory," Ser. No. 10/631,205, filed Jul. 31, 2003, "Mixed Stack-Based RISC Processor," Ser. No. 10/631,308, filed Jul. 31, 2003, "Processor That Accommodates Multiple Instruction Sets And Multiple Decode Modes," Ser. No. 10/631,246, filed Jul. 31, 2003, "System To Dispatch Several Instructions On Available Hardware Resources," Ser. No, 10/631,585, filed Jul. 31, 2003, "Micro-Sequence Execution In A Processor," Ser. No. 10/632,216, filed Jul. 31, 2003, "Program Counter Adjustment Based On The Detection Of An Instruction Prefix," Ser. No. 10/632,222, filed Jul. 31, 2003, "Reformat Logic To Translate Between A Virtual Address And A Compressed Physical Address," Ser. No. 10/632,215, filed Jul. 31, 2003, "Synchronization Of Processor States," Ser. No. 10/632,024, filed Jul. 31, 2003, "Conditional Garbage Based On Monitoring To Improve Real Time Performance," Ser. No. 10/631,195, filed Jul. 31, 2003, "Inter-Processor Control," Ser. No. 10/631,120, filed Jul. 31, 2003, "Cache Coherency In A Multi-Processor System," Ser. No. 10/632,229, filed Jul. 31, 2003, and "Concurrent Task Execution In A Multi-Processor, Single Operating System Environment," Ser. No. 10/632,077, filed Jul. 31, 2003.

BACKGROUND OF THE INVENTION

1. Technical Field

The present subject matter relates generally to processors and in a computing system.

2. Background Information

Despite well recognized advantages of using Java code such as portability, security, and code density, Java execution remains relatively slow thus militating against a wider acceptance into the marketplace. Accordingly, improvements to accelerate the execution of Java are desirable.

BRIEF SUMMARY

In some embodiments a system comprises a first processor, a second processor coupled to the first processor, memory coupled to, and shared by, the first and second processors, and a dedicated communication and synchronization channel including a synchronization unit coupled to the first and second processors. The second processor preferably comprises stack storage that resides in the core of the second processor. Further, the second processor executes stack-based instructions while the first processor executes one or more tasks including, for example, managing the memory of the system via an operating system that executes only on the first processor.

In other embodiments, a system comprises a first processor, a second processor coupled to the first processor, and memory coupled to, and shared by, the first and second processors. The second processor has a core that includes stack storage. The second processor also has an internal data memory that holds a contiguous block of memory defined by an address stored in a register, wherein local variables are stored in said data memory. The second processor executes stack-based instructions while the first processor executes one or more tasks, wherein the first processor manages the memory via an operating system that executes only on the first processor and the first processor executes a virtual machine that controls the execution of a program on the second processor. Other embodiments comprise other features as well as associated methods.

NOTATION AND NOMENCLATURE

Certain terms are used throughout the following description and claims to refer to particular system components. As one skilled in the art will appreciate, various companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

BRIEF DESCRIPTION OF THE DRAWINGS

For a more detailed description of the preferred embodiments of the present invention, reference will now be made to the accompanying drawings, wherein:

FIG. 4 shows various registers used in the JSM of FIGS. 1 and 3;

FIG. 5 illustrates a preferred operation of the JSM to include "micro-sequences";

DETAILED DESCRIPTION OF THE PREFERRED EMBODIMENTS

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

As is well known, Java is particularly suited for embedded applications. Java is a relatively "dense" language meaning that on average each instruction may perform a large number of functions compared to various other programming languages. The dense nature of Java is of particular benefit, for example, for portable, battery-operated devices that preferably include as little memory as possible to save space and power. As such, the subject matter disclosed herein is generally directed to a processor that is optimized for Java execution, although this disclosure and claims are not limited to Java. The Java-optimized processor preferably works in concert with another processor on which an operating system ("O/S") and other native applications run. Together and with other components, these processors form a multi-processor system. Various aspects of the Java-optimized processor and the system are described below.

General System Architecture

Figure 1:
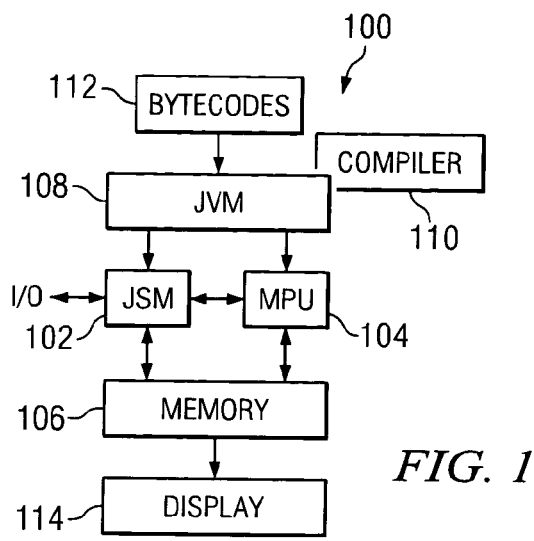
FIG. 1 shows a diagram of a system in accordance with preferred embodiments of the invention and including a Java Stack Machine ("JSM") and a Main Processor Unit ("MPU")
Figure 2:
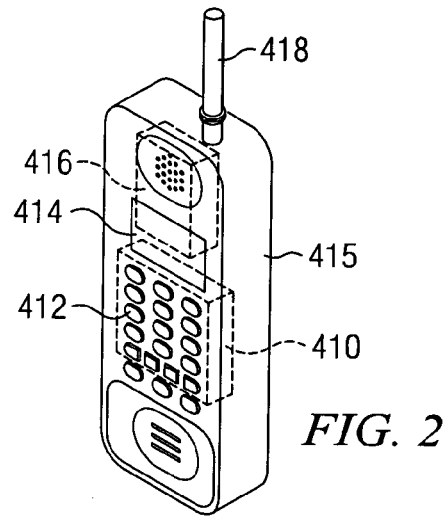
FIG. 2 depicts an exemplary embodiment of the system described herein in the form of a communication device (e.g., cellular telephone)

Referring now to FIG. 1, a system 100 is shown in accordance with a preferred embodiment of the invention. As shown, the system includes at least two processors 102 and 104. Processor 102 comprises the Java optimized processor and is referred to for purposes of this disclosure as a Java Stack Machine ("JSM"). Processor 104 is referred to as a Main Processor Unit ("MPU") and preferably is a RISC processor. System 100 may also include memory 106 coupled to both the JSM 102 and MPU 104 and thus accessible by both processors. At least a portion of the memory 106 may be shared by both processors meaning that both processors may access the same shared memory locations. Further, if desired, a portion of the memory 106 may be designated as private to one processor or the other. System 100 also includes a Java Virtual Machine ("JVM") 108, compiler 110, and a display 114. The JSM 102 preferably includes an interface to one or more input/output ("I/O") devices such as a keypad to permit a user to control various aspects of the system 100. In addition, data streams may be received from the I/O space into the JSM 102 to be processed by the JSM 102. Other components (not specifically shown) may be included as desired. As such, while system 100 may be representative of, or adapted to, a wide variety of electronic systems, an exemplary electronic system may comprise a battery-operated, mobile cell phone such as that shown in FIG. 2. As shown in FIG. 2, a mobile communications device includes an integrated keypad 412 and display 414. The JSM 102 and MPU 104 noted above and other components may be included in electronics package 410 which may be coupled to keypad 410, display 414, and radio frequency ("RF") circuitry 416 which may be connected to an antenna 418.

Referring again to FIG. 1, as is generally known, Java code comprises a plurality of "Bytecodes" 112. Bytecodes 112 may be provided to the JVM 108, compiled by compiler 110 and provided to the JSM 102 and/or MPU 104 for execution therein. In accordance with a preferred embodiment of the invention, the JSM 102 may execute at least some, and generally most, of the Java Bytecodes. When appropriate, however, the JSM 102 may request the MPU 104 to execute one or more Java Bytecodes not executed or executable by the JSM 102. In addition to executing Java Bytecodes, the MPU 104 also may execute non-Java instructions. The MPU 104 also hosts an operating system ("O/S") (not specifically shown), which performs various functions including system memory management, the system task management that schedules the JVM 108 and most or all other native tasks running on the system, management of the display 114, receiving input from input devices, etc. Without limitation, Java code may be used to perform any one of a variety of applications including multimedia, games or web based applications in the system 100, while non-Java code, which may comprise the O/S and other native applications, may still run on the system on the MPU 104.

The JVM 108 generally comprises a combination of software and hardware. The software may include the compiler 110 and the hardware may include the JSM 102. The JVM may include a class loader, bytecode verifier, garbage collector, and a bytecode interpreter loop to interpret the bytecodes that are not executed on the JSM processor 102.

In accordance with preferred embodiments of the invention, the JSM 102 may execute at least two instruction sets. One instruction set may comprise standard Java bytecodes. As is well-known, Java is a stack-based programming language in which instructions generally target a stack. For example, an integer add ("IADD") Java instruction pops two integers off the top of the stack, adds them together, and pushes the sum back on the stack. As will be explained in more detail below, the JSM 102 comprises a stack-based architecture with various features that accelerate the execution of stack-based Java code.

Another instruction set executed by the JSM 102 may include instructions other than standard Java instructions. In accordance with at least some embodiments of the invention, such other instruction set may include register-based and memory-based operations to be performed. This other instruction set generally complements the Java instruction set and, accordingly, may be referred to as a complementary instruction set architecture ("C-ISA"). By complementary, it is meant that the execution of various "complex" Java Bytecodes may be substituted by "micro-sequences" (explained below in more detail) using C-ISA instructions that permit address calculation to readily "walk through" the JVM data structures. Such micro-sequences also may use Bytecode instructions in addition to C-ISA instructions. The execution of Java may be made more efficient and run faster by replacing some sequences of Bytecodes by preferably shorter and more efficient sequences of C-ISA instructions. The two sets of instructions may be used in a complementary fashion to obtain satisfactory code density and efficiency. As such, the JSM 102 generally comprises a stack-based architecture for efficient and accelerated execution of Java bytecodes combined with a register-based architecture for executing register and memory based C-ISA instructions. Both architectures preferably are tightly combined and integrated through the C-ISA.

Figure 3:
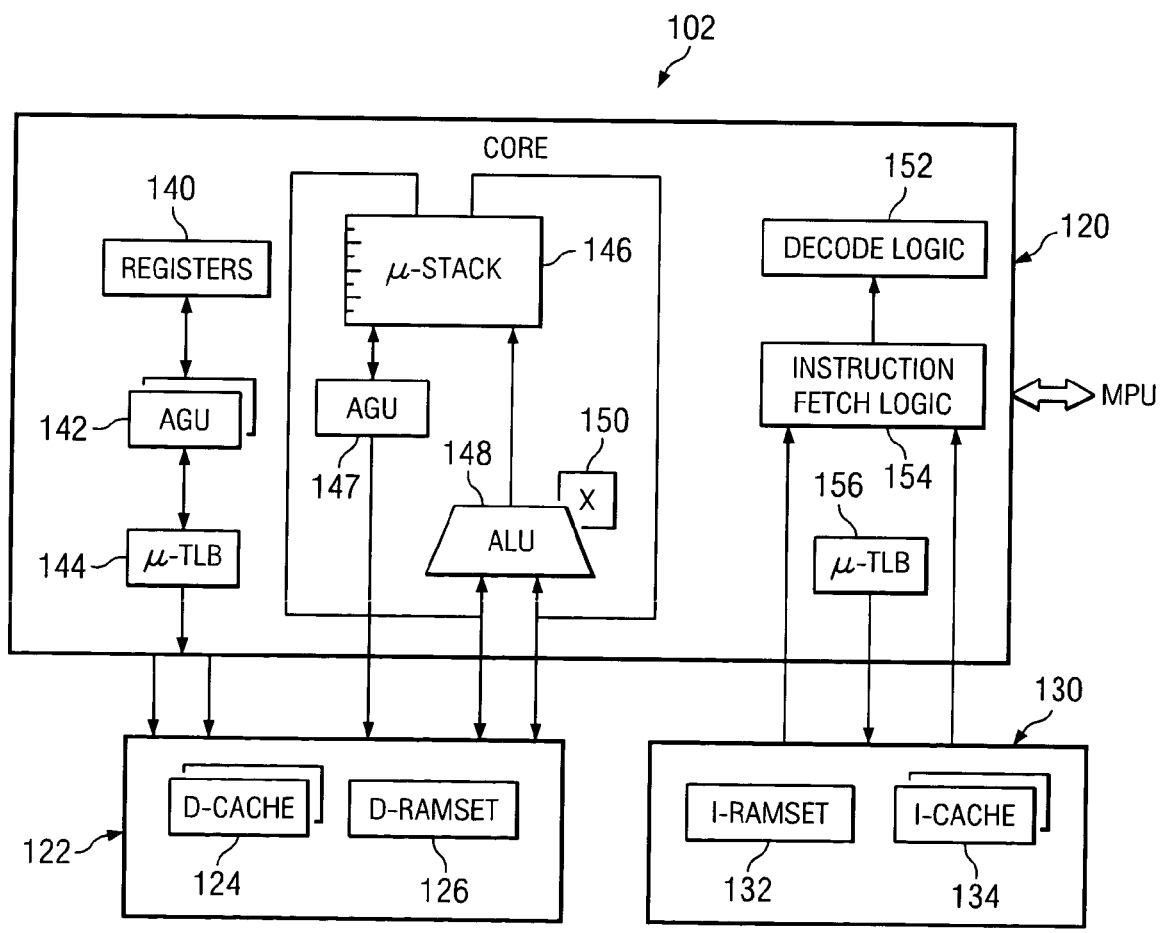
FIG. 3 shows a block diagram of the JSM of FIG. 1 in accordance with a preferred embodiment of the invention.

FIG. 3 shows an exemplary block diagram of the JSM 102. As shown, the JSM includes a core 120 coupled to data storage 122 and instruction storage 130. The core may include one or more components as shown. Such components preferably include a plurality of registers 140, three address generation units ("AGUs") 142, 147, micro-translation lookaside buffers (micro-TLBs) 144, 156, a multi-entry micro-stack 146, an arithmetic logic unit ("ALU") 148, a multiplier 150, decode logic 152, and instruction fetch logic 154. In general, operands may be retrieved from data storage 122 or from the micro-stack 146, processed by the ALU 148, while instructions may be fetched from instruction storage 130 by fetch logic 154 and decoded by decode logic 152. The address generation unit 142 may be used to calculate addresses based, at least in part on data contained in the registers 140. The AGUs 142 may calculate addresses for C-ISA instructions as will be described below. The AGUs 142 may support parallel data accesses for C-ISA instructions that perform array or other types of processing. The AGU 147 couples to the micro-stack 146 may manage overflow and underflow conditions in the micro-stack preferably in parallel. The micro-TLBs 144, 156 generally perform the function of a cache for the address translation and memory protection information bits that are preferably under the control of the operating system running on the MPU 104.

Referring now to FIG. 4, the registers 140 may include 16 registers designated as R0-R15. Registers R0-R3, R5, R8-R11 and R13-R14 may be used as general purposes ("GP") registers usable for any purpose by the programmer. Other registers, and some of the GP registers, may be used for specific functions. For example, registers R4 and R12 may be used to store two program counters. Register R4 preferably is used to store the program counter ("PC") and register R12 preferably is used to store a micro-program counter ("micro-PC"). In addition to use as a GP register, register R5 may be used to store the base address of a portion of memory in which Java local variables may be stored when used by the currently executing Java method. The top of the micro-stack 146 may be referenced by the values in registers R6 and R7. The top of the micro-stack has a matching address in external memory pointed to by register R6. The values contained in the micro-stack are the latest updated values, while their corresponding values in external memory may or may not be up to date. Register R7 provides the data value stored at the top of the micro-stack. Registers R8 and R9 may also be used to hold the address index 0 ("AI0") and address index 1 ("AI1"). Register R14 may also be used to hold the indirect register index ("IRI"). Register R15 may be used for status and control of the JSM 102.

Referring again to FIG. 3, as noted above, the JSM 102 is adapted to process and execute instructions from at least two instruction sets and one or more methods comprising such instructions. One instruction set includes stack-based operations and the second instruction set includes register-based and memory-based operations. The stack-based instruction set may include Java Bytecodes. Java Bytecodes pop, unless empty, data from and push data onto the micro-stack 146. The micro-stack 146 preferably comprises the top n entries of a larger stack that is implemented in data storage 122. Although the value of n may be vary in different embodiments, in accordance with at least some embodiments, the size n of the micro-stack may be the top eight entries in the larger, memory-based stack. The micro-stack 146 preferably comprises a plurality of gates in the core 120 of the JSM 102. By implementing the micro-stack 146 in gates (e.g., registers) in the core 120 of the processor 102, access to the data contained in the micro-stack 146 is generally very fast, although any particular access speed is not a limitation on this disclosure. The second register-based, memory-based instruction set may comprise the C-ISA instruction set introduced above. The C-ISA instruction set preferably is complementary to the Java bytecode instruction set in that the C-ISA instructions may be used to accelerate or otherwise enhance the execution of Java Bytecodes.

The ALU 148 adds, subtracts, and shifts data. The multiplier 150 may be used to multiply two values together in one or more cycles. The instruction fetch logic 154 generally fetches instructions from instruction storage 130. The instructions may be decoded by decode logic 152. Because the JSM 102 is adapted to process instructions from at least two instruction sets, the decode logic 152 generally comprises at least two modes of operation, one mode for each instruction set. As such, the decode logic unit 152 may include a Java mode in which Java instructions may be decoded and a C-ISA mode in which C-ISA instructions may be decoded.

The data storage 122 generally comprises data cache ("D-cache") 124 and a data random access memory ("D-RAMset") 126. Reference may be made to copending applications U.S. Ser. No. 09/591,537 filed Jun. 9, 2000, Ser. No. 09/591,656 filed Jun. 9, 2000, and Ser. No. 09/932,794 filed Aug. 17, 2001, all of which are incorporated herein by reference. The stack (excluding the micro-stack 146), arrays and non-critical data may be stored in the D-cache 124, while Java local variables and associated pointers as explained below, as well as critical data and non-Java variables (e.g., C, C++) may be stored in D-RAMset 126. The instruction storage 130 may comprise instruction RAM ("I-RAMset") 132 and instruction cache ("I-cache") 134. The I-RAMset 132 may be used to store "complex" micro-sequenced Bytecodes or micro-sequences or predetermined sequences of code. The I-cache 134 may be used to store other types of Java Bytecode and mixed Java/C-ISA instructions.

Micro-Sequence

FIG. 5 illustrates the operation of the JSM 102 to replace at least some Java Bytecodes with "micro-sequences." FIG. 5 shows some, but not necessarily all, components of the JSM 102. In particular, the instruction storage 130, the decode logic 152, and a micro-sequence vector table 162 are shown. The decode logic 152 accesses the instruction storage 130 and the micro-sequence vector table 162. In general and as described above, the decode logic 152 receives instructions (e.g., instructions 170) from instruction storage 130 via instruction fetch logic 154 (FIG. 3) and decodes the instructions to determine the type of instruction for subsequent processing and execution. In accordance with the preferred embodiments, the JSM 102 either executes the Bytecode from instructions 170 or replaces a Bytecode from instructions 170 with a micro-sequence as described below.

The micro-sequence vector table 162 may be implemented in the decode logic 152 or as separate logic in the JSM 102. The micro-sequence vector table 162 preferably includes a plurality of entries 164. The entries 164 may include one entry for each Bytecode that the JSM may receive. For example, if there are a total of 256 Bytecodes, the micro-sequence vector table 162 preferably comprises at least 256 entries. Each entry 164 preferably includes at least two fields—a field 166 and an associated field 168. Field 168 may comprise a single bit that indicates whether the instruction 170 is to be directly executed or whether the associated field 166 contains a reference to a micro-sequence. For example, a bit 168 having a value of "0" may indicate the field 166 is invalid and thus, the corresponding Bytecode from instructions 170 is directly executable by the JSM. Bit 168 having a value of "1" may indicate that the associated field 166 contains a reference to a micro-sequence.

If the bit 168 indicates the associated field 166 includes a reference to a micro-sequence, the reference may comprise the full starting address in instruction storage 130 of the micro-sequence or a part of the starting address that can be concatenated with a base address that may be programmable in the JSM. In the former case, field 166 may provide as many address bits as are required to access the full memory space. In the latter case, a register within the JSM registers 140, or preferably within a JSM configuration register accessible through an indirect addressing mechanism using the IRI register, is programmed to hold the base address and the vector table 162 may supply only the offset to access the start of the micro-sequence. Most or all JSM internal registers 140 and any other registers preferably are accessible by the main processor unit 104 and, therefore, may be modified by the JVM as necessary. Although not required, this latter addressing technique may be preferred to reduce the number of bits needed within field 166. At least a portion 180 of the instruction 130 may be allocated for storage of micro-sequences and thus the starting address may point to a location in micro-sequence storage 130 at which a particular micro-sequence can be found. The portion 180 may be implemented in I-RAM 132 discussed above in FIG. 3.

Although the micro-sequence vector table 162 may be loaded and modified in accordance with a variety of techniques, the following discussion includes a preferred technique. The vector table 162 preferably comprises a JSM resources that is addressable via register R14 functioning as an indirect register index ("IRI") register as mentioned above. A single entry 164 or a block of entries within the vector table 162 may be loaded by information from the data cache 124 (FIG. 3). When loading multiple entries (e.g., all of the entries 164) in the table 162, a repeat loop of instructions may be executed. Prior to executing the repeat loop, a register (e.g., R0) preferably is loaded with the starting address of the block of memory containing the data to load into the table. Another register (e.g., R1) preferably is loaded with the size of the block to load into the table. Register R14 is loaded with the value that corresponds to the first entry in the vector table that is to be updated-loaded. An "I" bit in the status register R15 preferably is set to indicate that the register R14 is intended for use as an IRI register. Otherwise, the "I" bit specifies that register R14 is to be used as a general purpose register.

The loop initiated by a "repeat" instruction comprises two instructions that are repeated n times. The value n preferably is the value stored in register R1. The first instruction in the loop preferably performs a load from the start address of the block (R0) to the first entry in the vector table 162. The second instruction in the loop preferably adds an "immediate" value to the block start address. The immediate value may be "2" if each entry in the vector table is 16 bits wide. The loop repeats itself to load the desired portions within the memory to the vector table.

In operation, the decode logic 152 uses a Bytecode from instructions 170 as an index into micro-sequence vector table 162. Once the decode logic 152 locates the indexed entry 164, the decode logic 152 examines the associated bit 168 to determine whether the Bytecode is to be replaced by a micro-sequence. If the bit 168 indicates that the Bytecode can be directly processed and executed by the JSM, then the instruction is so executed. If, however, the bit 168 indicates that the Bytecode is to be replaced by a micro-sequence, then the decode logic 152 preferably changes this instruction into a "NOP" and sets the micro-sequence-active bit (described above) in the status register R15. In another embodiment, the JSM's pipe may be stalled to fetch and replace this micro-sequenced instruction by the first instruction of the micro-sequence. Changing the micro-sequenced Bytecode into a NOP while fetching the first instruction of the micro-sequence permits the JSM to process multi-cycle instructions that are further advanced in the pipe without additional latency. The micro-sequence-active bit may be set at any suitable time such as when the micro-sequence enters the JSM execution stage (not specifically shown). The delay due to replacing the initial instruction by the first instruction of the micro-sequence is reduced to a minimum corresponding to the fetch latency in storage 180 that can be as small as zero wait state.

As described above, the JSM 102 implements two program counters—the PC (register R4) and the micro-PC (register R12). In accordance with a preferred embodiment, one of these two program counters is the active program counter used to fetch and decode instructions. The PC 186 stored in register R4 may be the currently active program counter when the decode logic 152 encounters a Bytecode to be replaced by a micro-sequence. Setting the status register's micro-sequence-active bit causes the micro-program counter 188 (register R12) to become the active program counter instead of the program counter 186. Also, the contents of the field 166 associated with the micro-sequenced Bytecode preferably is loaded into the micro-PC 188. At this point, the JSM 102 is ready to begin fetching and decoding the instructions comprising the micro-sequence. At or about the time the decode logic begins using the micro-PC 188 from register R12, the PC 186 preferably is incremented by a suitable value to point the PC to the next instruction following the Bytecode that is replaced by the micro-sequence. In at least some embodiments, the micro-sequence-active bit within the status register R15 may only be changed when the first instruction of the micro-sequence enters the execute phase of JSM 102 pipe. The switch from PC 186 to the micro-PC 188 preferably is effective immediately after the micro-sequenced instruction is decoded, thereby reducing the latency.

The micro-sequence may end with a predetermined value or Bytecode from the C-ISA called "RtuS" (return from micro-sequence) that indicates the end of the sequence. This C-ISA instruction causes a switch from the micro-PC (register R12) to the PC (register R4) upon completion of the micro-sequence. Preferably, the PC 186 previously was incremented, as discussed above, so that the value of the PC 186 points to the next instruction to be decoded. The instruction may have a delayed effect or an immediate effect depending on the embodiment that is implemented. In embodiments with an immediate effect, the switch from the micro-PC to the PC is performed immediately after the instruction is decoded and the instruction after the RtuS instruction is the instruction pointed to by the address present in the PC 186.

As discussed above, one or more Bytecodes may be replaced with a micro-sequence or group of other instructions. Such replacement instructions may comprise any suitable instructions for the particular application and situation at hand. At least some such suitable instructions are disclosed in co-pending application entitled "Mixed Stack-Based RISC Processor," (atty docket no. TI-35433), incorporated herein by reference.

Inter-Processor Synchronization

Figure 6:
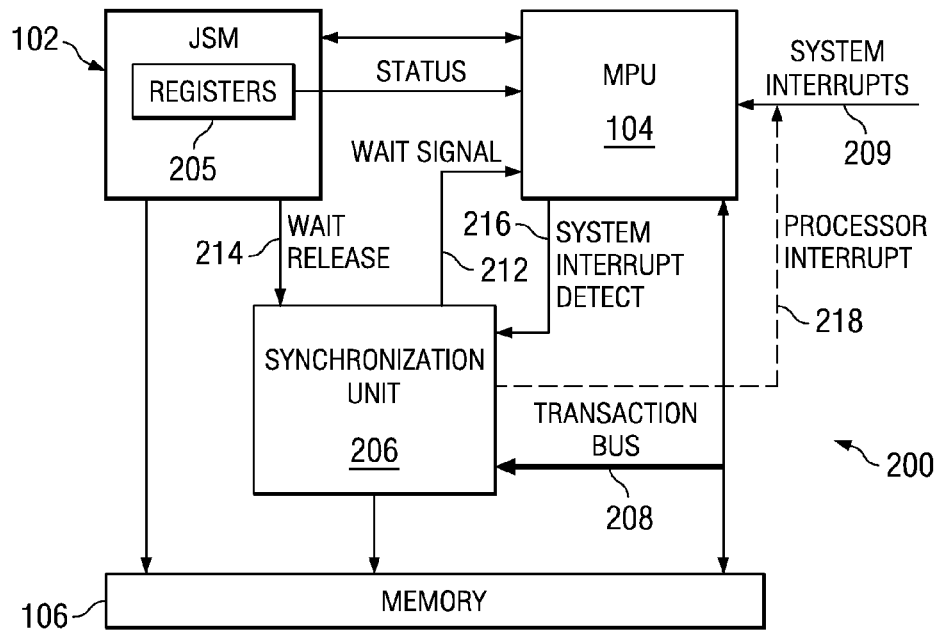
FIG. 6 shows a preferred embodiment using wait logic coupled to the JSM and MPU.
Figure 7:
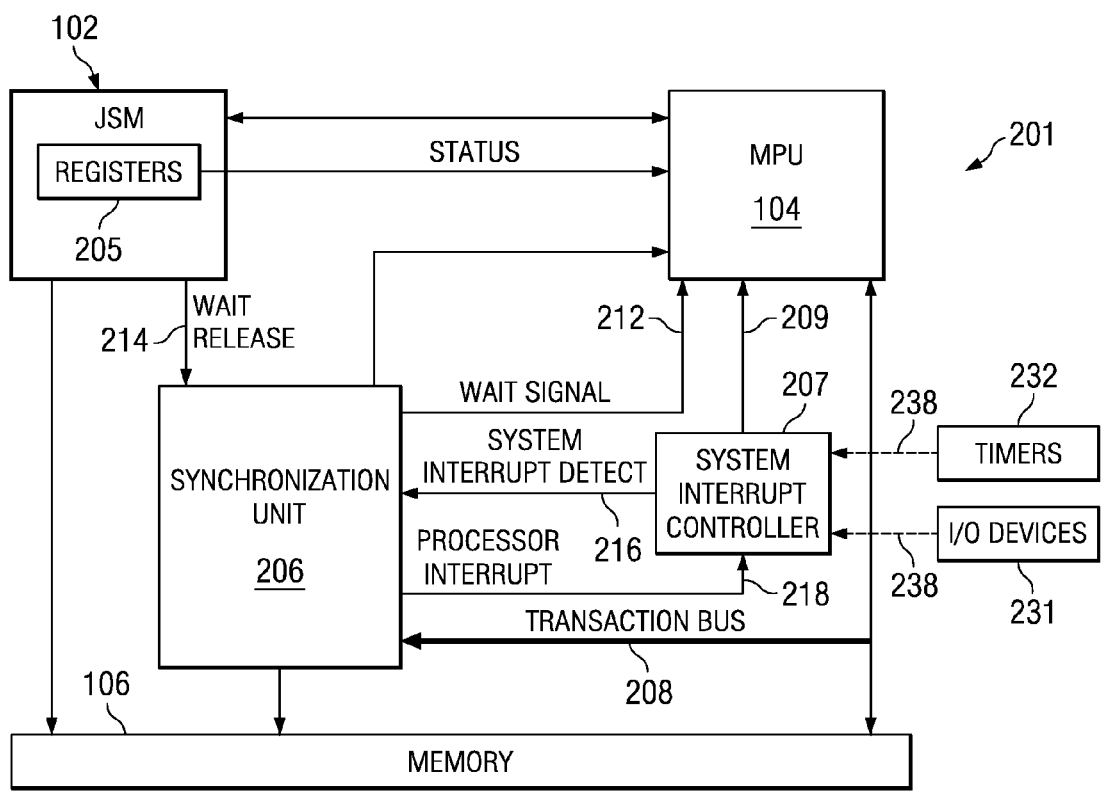
FIG. 7 shows an alternative embodiment using wait logic coupled to the JSM and MPU.
Figure 8:
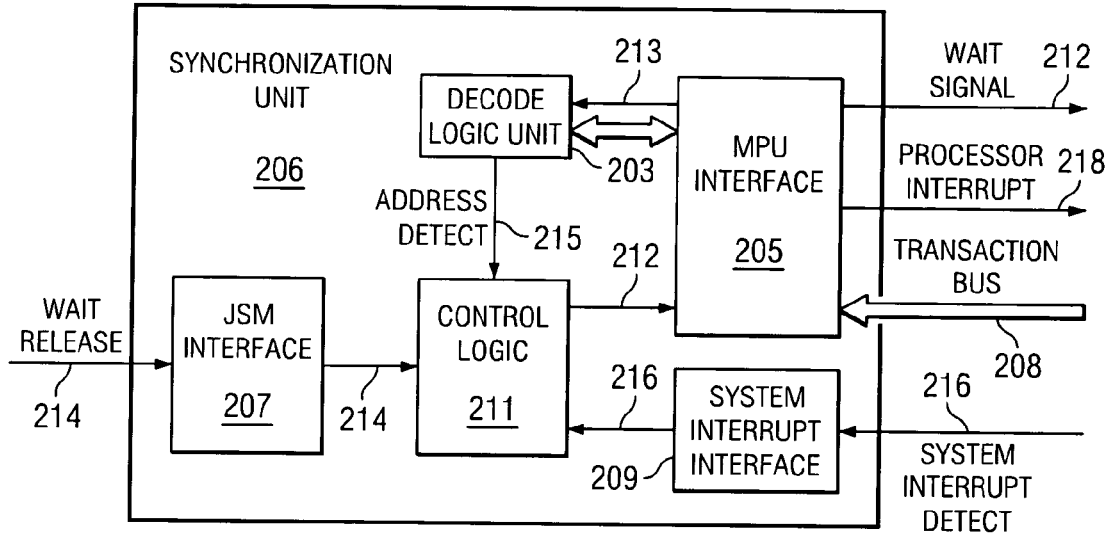
FIG. 8 shows a block diagram of the synchronization unit used in the embodiments of FIGS. 5 and 6.

FIGS. 6-8 illustrate various techniques usable to synchronize the operation of multiple processors in a system 200. As shown, the system 200 may comprise the JSM 102, the MPU 104, a synchronization unit 206, a transaction bus 208, memory 106, and a variety of signals such as a wait signal 212, a wait release 214, system interrupts 209, a system interrupt detect signal 216, and a processor interrupt 218. Other components (not shown) may be included as well.

In operation, the MPU 104 performs memory accesses through a transaction bus 208 to memory 106. These accesses may include read or write cycles targeting various locations in memory 106. The transaction bus 208 preferably is also provided to synchronization unit 206, thereby permitting the synchronization unit 206 to monitor transactions that target one or more predetermined addresses as will be explained below.

In accordance with the preferred embodiments, at least one address (or a range of addresses) is selected or otherwise pre-determined to be used to place the MPU 104 in a "wait" mode. The wait mode is generally specific to the particular processor selected as processor 104 and may include a lower performance or lower power mode in which, for example, one or more clocks internal to the processor 104 are disabled. The pre-determined address preferably is mapped to a physical memory location and thus can be used as a mechanism for initiating the MPU's transition to the wait mode. To initiate the transition to the wait mode, the MPU 104 preferably performs a read or write access targeting the address pre-determined for use for this purpose. As such, when the synchronization unit 206 detects an access on transaction bus 208, the synchronization unit 206 determines whether the access is for the predetermined address. The synchronization unit 206 responds to the detection of the access having the pre-determined address by asserting wait signal 212 to the MPU 104.

In another embodiment, instead of mapping this transaction to a physical address, the transaction could be mapped on a dedicated communication bus (i.e., a co-processor bus) between the MPU 104 and the JSM 102, whereby a transaction to the specific address of the communication bus or a specific command on the communication bus performs the same function as addressing a physical memory address While the MPU 104 is in a wait mode, the JSM 102 may execute instructions or otherwise be occupied. The JSM 102 may encounter an instruction that requires support from, or at least benefits from support by, the MPU 104. Accordingly, the JSM 102 may assert a wait release signal 214 to the synchronization unit 206, thereby causing the synchronization unit 206 to de-assert the wait signal 212. Once the wait signal 212 is de-asserted as described below, the MPU 104 can execute the instruction for which the JSM 102 needed support.

In at least some embodiments, upon "waking up," the MPU 104 preferably requests a status from the JSM 102. The status may include, without limitation, one or more status bits of a register 205 that indicate whether the JSM 102 is actively executing instructions and identify any instruction(s) that the MPU 104 is to execute. The register 205 may comprise the status register R15 described above with regard to FIG. 4.

In addition to being awoken by the assertion of the wait release signal 214 by the JSM 102, the MPU 104 may be awoken by a system interrupt 209. The system interrupt 209 may be sent to the MPU 104, which asserts a system interrupt detect signal 216 to the synchronization unit 206 to cause the de-assertion of the wait signal 212. The system interrupt 209 may be sent by a variety of system components (not shown), for example, I/O devices, timers, etc., to allow the MPU 104 to carry out, for example, routine maintenance, such as memory allocation and de-allocation, and other operations as desired.

After finishing the task prompted by the system interrupt 209, the MPU 104 may read the status of the JSM 102. If the JSM 102 is in an idle state (i.e., the JSM 102 is not actively executing instructions), the MPU 104 may execute one or more instructions one behalf of the JSM 102. As previously described, the JSM 102 may encounter an instruction that requires, or at least benefits from, the support of the MPU 104. Thus, this instruction may be executed by the MPU 104. If the JSM 102 is not in an idle state, the MPU 104 may transition to a wait mode again as previously described (i.e., by executing a memory access to a pre-determined address detectable by the synchronization unit 206).

In at least some embodiments of the invention, the MPU 104 may prioritize multiple tasks when awake. For example, if the MPU 104 has been awoken by a system interrupt 209, more than one interrupt source may have positioned the system interrupt 209 and the MPU will perform the associated tasksaccording to their pre-determined priority. In at least some embodiments, an operating system ("O/S") running of the MPU 104 may control the order in which the MPU 104 carries out multiple interrupt requests.

In some situations, for example, when a system interrupt 209 has awoken the MPU 104 as described above, the JSM 102 may be unaware that the MPU 104 has awoken. In this situation the JSM 102 may assert the wait release signal 214 as described above to obtain processing support from the MPU 104. Assertion of the wait release signal in this context causes the synchronization unit 206 to assert a processor interrupt signal 218 to the MPU 104. The asserted processor interrupt signal 218 preferably causes the MPU to temporarily stop executing a task, e.g. a routine maintenance task initiated upon occurrence of a system interrupt 209, to execute instructions as requested by the JSM 102. In other embodiments, the processor interrupt signal 218 is not used and any request by the JSM 102 is handled after the MPU 104 has finished the task(s) initiated by a system interrupt 209.

In embodiments in which multiple signals (e.g. system interrupt 209, system interrupt detect 216, wait release 214) occur simultaneously, approximately simultaneously, or concurrently, the operating system ("O/S") running on the MPU 104 may decide, according to a pre-determined priority, whether the MPU 104 will execute instructions as requested by the JSM 102 or execute the task(s) requested by the system interrupt 209. As shown in FIG. 6, the processor interrupt signal 218 asserted by the synchronization unit 206 as described above may be received by the MPU 104 as a system interrupt 209 and handled according to a pre-determined priority. More specifically, the embodiment described above enables the O/S running on the MPU 104 to schedule multiple types of support requests from the JSM 102 relative to their respective priority as compared to other requests (e.g., system interrupts 209) handled by the MPU. Some of the support requests from the JSM 102 may have lower priority than some system interrupts 209, while other support requests from the JSM 102 have a higher priority. The priority of a support request from the JSM 102 may be included in the status read by the MPU 104 as described above. The processor interrupt may itself contain the priority information as well.

FIG. 7 is a diagram illustrating another embodiment of the invention. As shown in FIG. 7, system 201 comprises the same components and signals as system 200 of FIG. 6, with the addition of a system interrupt controller 207. The system interrupt controller 207 preferably receives the processor interrupt signal 218 from the synchronization unit 206 and request signals 238 from system components (e.g., I/O devices 231, timers 232, or other devices), and asserts the system interrupt detect 216 signal to the synchronization unit 206 and the system interrupt signal 209 to the MPU 104. The function of the components and signals of system 201 is otherwise described above for system 200.

FIG. 8 is a block diagram illustrating an embodiment of the synchronization unit 206. As shown in FIG. 8, the synchronization unit 206 may comprise a decode logic unit 203, a MPU interface 205, a JSM interface 207, a system interrupt interface 209, and control logic 211. The control logic 211 preferably couples to the MPU interface 205, the JSM interface 207, and the system interrupt interface 209 as shown. Transaction information 213 (e.g., address, clock, or other information as may be helpful to detect that a transaction has been or is in the process of being made) received through transaction bus 208 preferably is provided by the MPU interface 205 to the decode logic unit 203.

The decode logic unit 203 detects a transaction targeting a pre-determined address that is initiated by the MPU as described above. For example, if the transaction is detected by recognizing that a pre-determined address has been or is to be accessed, the decode logic unit 203 may assert an address detect signal 236 to the control logic 211 when the transaction bus address matches the pre-determined address or falls within a pre-determined range of addresses. Upon detecting the assertion of the address detect signal 215, control logic 211 preferably asserts the wait signal 212 which is propagated via the MPU interface 205 to the MPU as described above. The control logic 211 may assert, or not, the wait signal when it receives an address detect signal 215 depending on the state of the wait release signal 214 and the system interrupt signal 216.

Referring still to FIG. 8, the JSM interface 207 may be used to receive a wait release signal 214 from the JSM as explained above. The JSM interface 207 may then propagate the wait release signal 214 to the control logic 211. If the wait signal 212 is already de-asserted when a wait release signal 214 is received, a processor interrupt signal 218 may be asserted. More specifically, the control logic 211 may assert, or not, the processor interrupt signal 218 when it receives a wait release signal 214 depending on the state of the address detect signal 215 and the state of the wait signal 212. As explained above, the processor interrupt 218 may permit the MPU to temporarily stop executing a task, in order to execute one or more instructions for the JSM 102.

The system interrupt interface 209 receives the system interrupt detect signal 216 from the MPU or system interrupt controller and propagates the system interrupt detect signal 216 to the control logic 211. The control logic 211 may de-assert the wait signal 212 when it receives the wait release signal 214 and/or the system interrupt detect signal 216. As previously described, the assertion and de-assertion of the wait signal 212 causes a processor to enter or wake up from a wait mode. In at least some embodiments, the control logic 211 may receive inputs, e.g., system interrupt detect 216, address detect signal 215, wait release signal 214, etc., and accordingly asserts or de-asserts the wait signal 212.

As described above, the synchronization unit 206 may be used in combination with the JSM and MPU processors 102 and 104. As such, the synchronization unit 206 may function to synchronize the operation of the JSM and MPU to permit efficient switching between such processors. The synchronization unit 206 which is shown as a separate unit in FIGS. 6 and 7, may be included as part of the JSM 102 in some embodiments of the invention.

Local Variable Memory Management

In accordance with a preferred embodiment of the invention, at least some applications executed by the JSM 102 comprise one or more methods. A "method" includes executable instructions and performs one or more functions. Other terms for "method" may include subroutines, code segments, and functions, and the term should not be used to narrow the scope of this disclosure.

Figure 9:
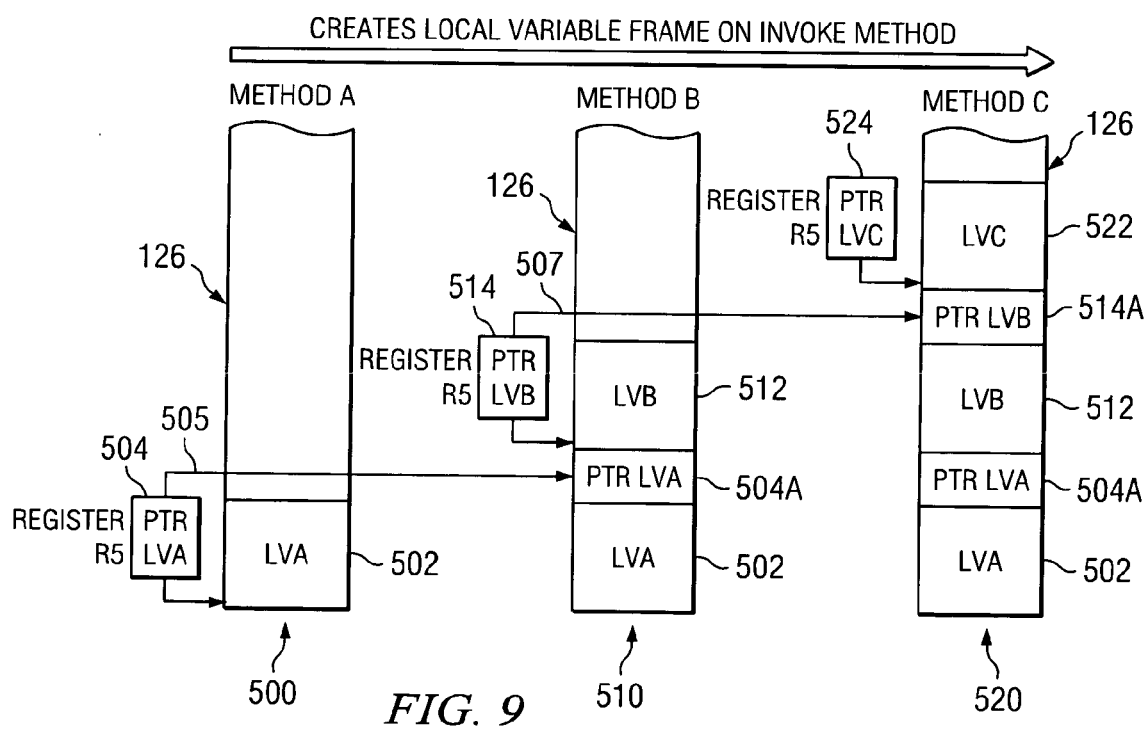
FIG. 9 illustrates the storage of local variables and pointers in accordance with the preferred embodiments.

A method (the "calling" method) may call another method (the "called" method). Once the called method performs its function, program control returns to the calling method. Multiple hierarchical levels of methods are possible as illustrated in FIG. 9 which illustrates the interaction between three methods (Method A, Method B, and Method C). For purposes of the example of FIG. 9, method A calls method B and method B calls method C. As such, method A is the calling method for method B which is the called method relative to method A and only while method A is executing. Similarly, method B is the calling method relative to method C which is considered the called method relative to method B.

A method may have one or more "local variables," as explained previously. Local variables may be used to temporarily store data or other information as the method performs its task(s). The local variables preferably are specific to the method to which the variables pertain. That is, method A's local variables ("LVA") are accessible generally by only method A and have meaning only to method A. Once method A completes, the method A local variables become meaningless. Similarly, LVB and LVC comprise local variables associated with methods B and C, respectively. Java Bytecodes refer to local variables using an index. The JVM maintains a local variables pointer ("PTR LV") which points to the base address of the memory containing the current method's local variables. To access a particular local variable, a suitable index value is added to the base address to obtain the address of the desired local variable.

FIG. 9 generally shows the state of the D-RAMset 126 in accordance with a time sequence of events 500, 510, and 520 as each method B and C is invoked. In sequence 500, method A is invoked and storage space 502 is allocated for its local variables (LVA). A base pointer (PTR LVA) 504 also is determined or selected to point to the base portion of LVA storage space 502. Using the pointer PTR LVA, references may be made to any local variable within method A's local variable set 502 by computing an index or offset to the PTR LVA value.

Although a plurality of methods may run on the JSM 102, typically only one method is "active" at a time having its instructions actively being executed by the JSM 102. The base pointer of the currently active method preferably is stored in register R5 as noted previously. In general, the base pointer for the active method may be computed by the JVM 108 while executing the invoke bytecode of the active method. This bytecode is a complex bytecode executed by a micro-sequence or by the JVM.

Sequence 510 depicts the state of the D-RAMset 126 when method A calls method B. In accordance with the preferred embodiments of the invention, the local variables (LVB) associated with method B are stacked in storage space 512 generally adjacent LVA ("on top of" LVA when viewed as in FIG. 9). Following arrow 505, the base pointer for LVA (PTR LVA) preferably is also stored in the D-RAMset 126 adjacent (e.g., below) the LVB data at location 504A. Thus, the two local variable sets LVA and LVB may be separated by the base pointer (PTR LVA) for LVA and possibly other data. Once the base pointer 504 for LVA is stored adjacent (below) the reserved space for the LVB data set 502, register R5 is updated (i.e., loaded) with a base pointer 514 for use with the LVB data set.

The JSM 102 may load LVA's base pointer 504 into location 504A by executing a store instruction to store LVA's base pointer at location 504A. Location 504A may be determined as the location pointed to by the base pointer of LVB (PTR LVB) minus 1. That is, the set of local variables associated with method B is mapped adjacent the pointer associated with method A's local variables. The value of PTR LVB may be determined as the sum of the value for PTR LVA 504, the size of LVA 502, and a value p. The value p may be an integer that is appropriate to take into account the size of the pointer itself and thus may be more than 4 bytes. Other data may be present between the storage areas for LVA 502 and LVB 512.

Following arrow 507 to time sequence 520, when method C is invoked (called by method B), the base pointer for method B (PTR LVB) is stored in location 514A which may be on top of LVB and below PTR LVC as shown and register R5 is loaded with the base pointer 524 (PTR LVC) to the base of the LVC data set 522. Method C's local variables (LVC) are allocated to storage space 522 which generally is adjacent (on top of) LVB 512 and PTR LVB 514A as shown. The PTR LVB value is stored in location 514A according to a similar calculation as that described above.

Figure 10:
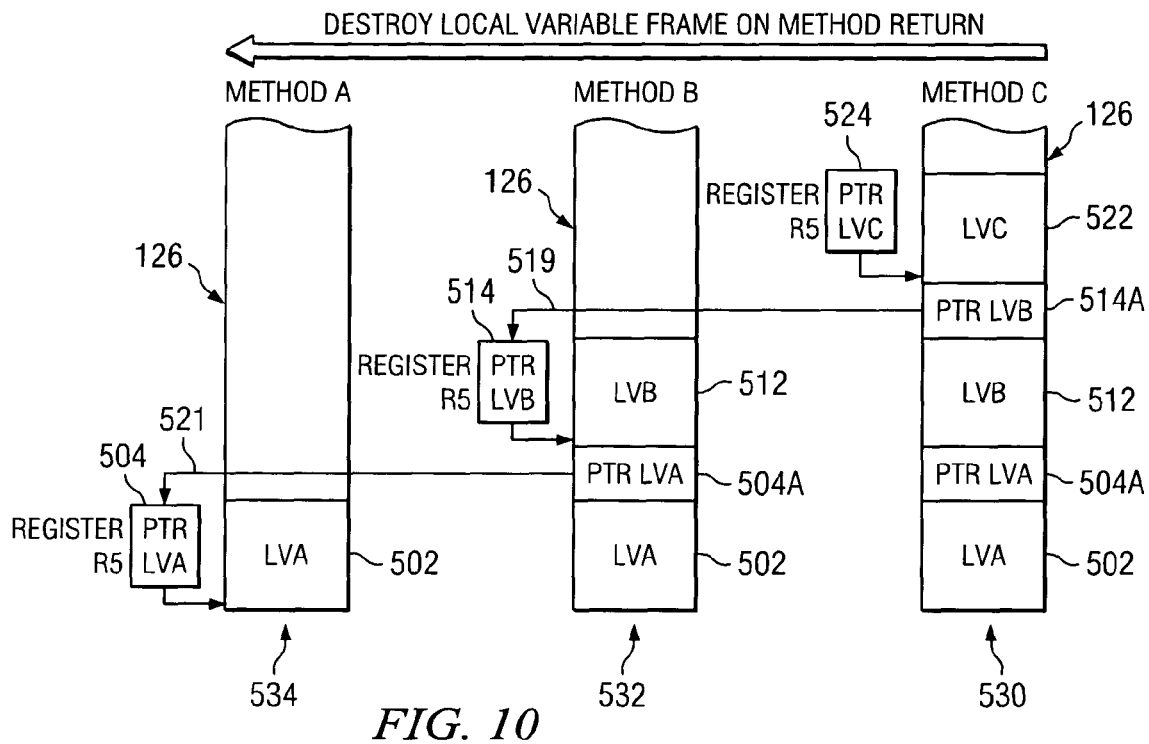
FIG. 10 illustrates the use of the local variable pointers upon returning from a method.

FIG. 10 illustrates the return process as each method (Methods C and then B) completes and returns to its calling method (methods B and then A). Beginning with time sequence 530 in which the local variable frame comprises LVA, LVB, and LVC along with pointers PTR LVA and PTR LVB for LVA and LVB, method C completes. Control returns to method B and LVB's base pointer is loaded from location 514A into register R5 as shown by arrow 519 at time sequence 532 by accessing PTR LVB through a load instruction that include a fixed offset from PTR LVC as a target address. Then, when method B completes, LVA's pointer (PTR LVA) is loaded into register R5 from location 504A as illustrated by arrow 521 at time sequence 534. The base pointers may be retrieved from their locations in cached-RAMset 126 by loading the value located at the location pointed by the currently active method's base pointer minus an offset (e.g., 1).

In accordance with preferred embodiments of the invention, the D-RAMset 126 is configured to provide any one or more or all of the following properties. The implementation of the D-RAMset 126 to provide these properties is explained in detail below. The local variables and pointers stored in the D-RAMset 126 preferably are "locked" in place meaning that, although the D-RAMset 126 is implemented as cache memory, eviction of the local variables generally can be prevented in a controlled manner. The locking nature of the D-RAMset 126 may be beneficial while a method executes to ensure that no cache miss penalty is incurred. Additionally, write back of valid, dirty local variables to main memory 106 is avoided in at least some situations (specified below). Further, mechanisms can be employed in the event that the D-RAMset 126 has insufficient capacity to accommodate all desired local variables. Further still, once a method has completed, the portion of the D-RAMset allocated for the completed method's local variables remains marked as "valid." In this way, if and when new methods are invoked and re-use the RAMset space (such as that described in one or more of the copending applications mentioned above and incorporated herein by reference), such methods' associated local variables will be mapped to the same portion of the D-RAMset. If the RAMset lines are already marked as valid, access to those new local variables does not generate any misses. Retrieval of data from memory is unnecessary because the local variables only have significance while a method executes and a newly executing method first initializes all of its local variables before using them. Not generating misses and thus avoiding fetching lines from external memory reduces latency. After a relatively short period of time following the start of a Java program execution, all relevant lines of the RAMset are marked as valid and accesses to local variables of newly called methods do not generate misses, thereby providing superior performance of a "0-wait state memory." Furthermore, the cache properties of RAMset allow discarding or saving of the data in main memory whenever required.

In accordance with a preferred embodiment of the invention, the local variables (LVA-LVC) and associated pointers (PTR LVA-PTR LVC) may be stored in D-RAMset 126. The D-RAMset 126 may be implemented in accordance with the preferred embodiment described below and in copending applications entitled "Cache with multiple fill modes," filed Jun. 9, 2000, Ser. No. 09/591,656; "Smart cache," filed Jun. 9, 2000, Ser. No. 09/591,537; and publication no. 2002/0065990, all of which are incorporated herein by reference.

As described in greater detail below, in the preferred embodiment, the data storage 122 (FIG. 3) preferably comprises a 3-way cache with at least one cache way comprising D-RAMset 126. The D-RAMset (or simply "RAMset") cache 126 may be used to cache a contiguous block of memory (e.g., local variables and pointers as described above) starting from a main memory address location. The other two cache ways 124 may be configured as RAMset cache memories, or use another architecture as desired. For example, the data storage 122 may be configured as one RAMset cache 126 and a 2-way set associative cache 124. As such, the data storage 122 generally comprises one or more forms of cache memory. The instruction storage 130 may be similarly configured if desired.

In operation, the processor's core 102 may access main memory 106 (FIG. 1) within a given address space. If the information at a requested address in main memory 106 is also stored in the data storage 122, the data is retrieved from the data cache 124, 126. If the requested information is not stored in data cache, the data may be retrieved from the main memory 106 and the data cache 124, 126 may be updated with the retrieved data.

Figure 11:
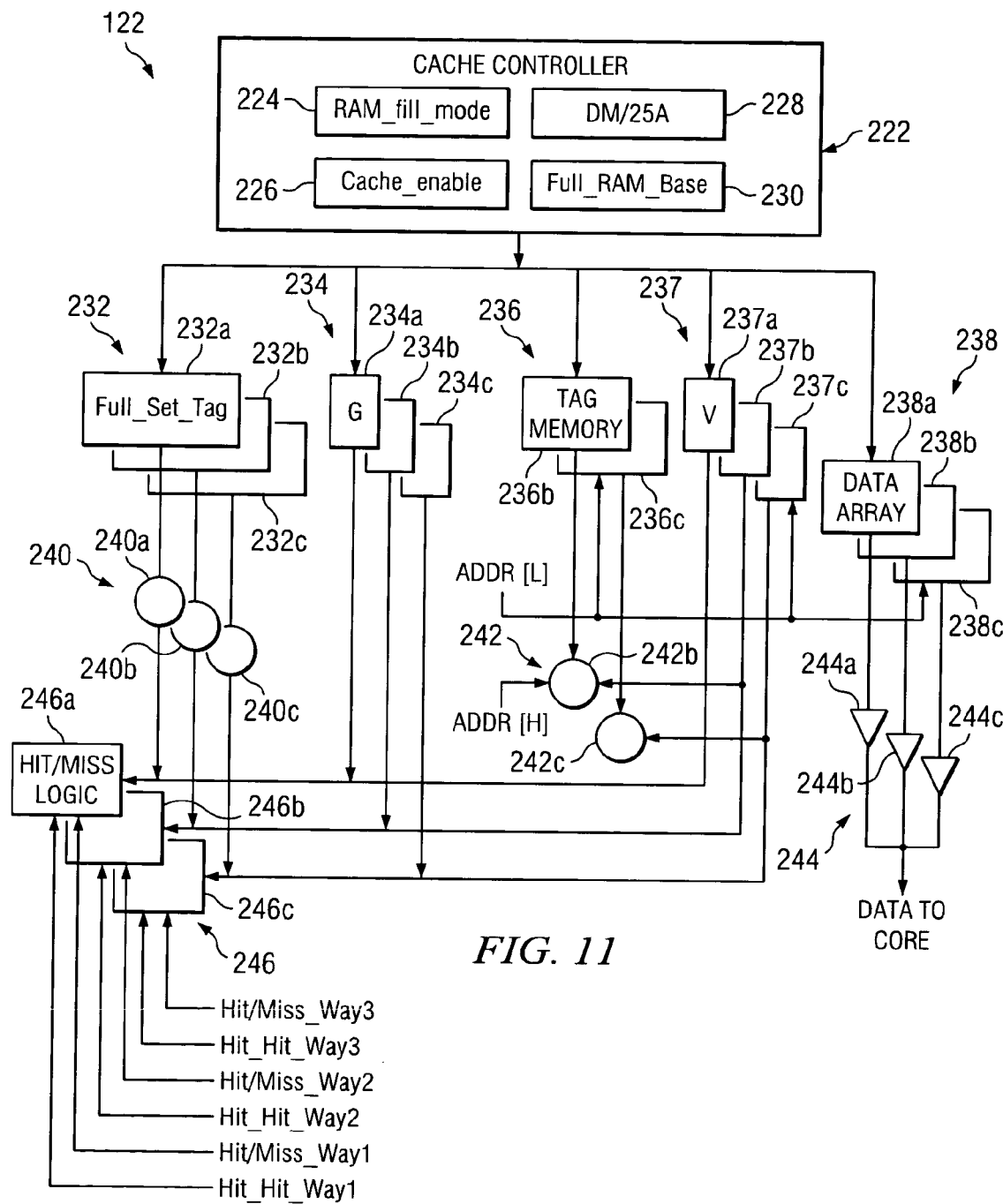
FIG. 11 illustrates a preferred embodiment of cache-based data storage in the JSM of FIG. 3.

FIG. 11 illustrates a more detailed block diagram of the data storage 122 in accordance with a preferred embodiment with a RAMset cache and a two-way set associative cache. A cache controller 222 may control operation of the data storage 122. Cache controller 222 may include a plurality of status bits including, without limitation, the following four status bits: RAM_fill_mode 224, Cache_Enable 226, DM/2SA 228 and Full_RAM_base 230 as well as other bits that are not specifically shown in FIG. 11. The two-way associative cache may be configured as a direct map and its other way configured as a RAMset. Alternatively, the two-way set associative cache may be configured as two additional RAMsets depending on cache control bit DM/2SA 238 and FULL_RAM_Set_base 230 as described in at least one of the documents incorporated herein by reference. However, the preferred configuration comprises a single RAMset coupled to a standard data cache. The RAMset is not limited in size, nor must the RAMset have the same size as the other cache way. Therefore, if another RAMset is needed for capacity reasons, a single RAMset with a larger capacity may be preferred.

As shown, cache controller 222 couples to Full_Set_Tag registers 232 (individually referenced as registers 232a through 232c), Global_Valid bits 234 (individually referenced as bits 234a through 234c), tag memories 236 (individually referenced as tag memories 236b and 236c), valid entry bit arrays 237 (individually referenced as bit arrays 237a through 237c) and data arrays 238 (individually referenced as data arrays 238a through 238c). Comparators 240 (individually referenced as comparators 240a through 240c) may couple to respective Full_Set_Tag registers 232. Comparators 242 (individually referenced as comparators 242b and 242c) couple to respective tag memories 236. Output buffers 244 (individually referenced as buffers 244a through 244c) may couple to respective data arrays 238. Hit/Miss logic 246 (individually referenced as logic 246a through 246c) may couple to comparators 240, global valid bits 234, valid bits 237, RAM_fill_mode bit 224 and Cache_Enable bit 226.

In operation, data storage 122 may be configured using the control bits 224, 226, 228 and 230. The Cache_Enable 226 allows the data storage to be enabled or disabled, as in standard cache architecture. If the data storage 122 is disabled (e.g., Cache Enable=0), data read accesses may be performed on the main memory 106 without using the data storage 122. If the data storage 122 is enabled (e.g., Cache_Enable=1), data may be accessed in the data storage 122, in cases where such data is present in the data storage. If a miss occurs, a line (e.g., 16 bytes) may be fetched from main memory 106 and provided to the core 120.

Referring still to FIG. 11, the size of the data array 238a may be different than the size of the data arrays 238 b, c for the other ways of the cache. For illustration purposes and without limiting this disclosure in any way, it will be assumed that data arrays 238b and 238c are each 8 Kbytes in size, configured as 512 lines, with each line holding eight two-byte data values. Data array 238a may be 16 Kbytes in size, configured as 1024 lines, each line holding eight, two byte data values. The ADDR[L] signals may be used to address one line of the data array 238 and valid bit array 237 (and tag memory 236, where applicable). Accordingly, for the 1024-line first way, ADDR[L] may include 10 bits [13:4] of an address from the core. For the 512-line second and third ways, ADDR[L] may include 9 bits [12:4] of an address from the core. The ADDR[L] signals define which set is mapped to a line. Thus, assuming a 4 Gbyte address space, ADDR[H] uses bits [31:14] of an address from the core for the first way and uses bits [31:13] for each of the second and third ways of the cache 130.

The tag memories 236 and comparators 242 may be used for a two-way set associative cache (e.g., D-cache 124 in FIG. 3). When the core 120 performs a memory access, the tag memories 236 are accessed by the low order bits of the address (ADDR[L]). The tag memory locations store the high order address bits of the main memory address of the information stored in a corresponding line of the data array 238. These high order address bits may be compared with the high order address bits (ADDR[H]) of the address from the core 120. If the ADDR[H] matches the contents of the tag memory at ADDR[L], a hit occurs if the valid bit associated with the low order bits indicates that the cache entry is valid. If a cache hit occurs, the data from the corresponding data array 238 at ADDR[L] may be provided to the core 120 by enabling the corresponding output buffer 244. As described below, data from the 2-way cache is presented to the core 120 if there is a miss in the RAMset cache. By itself, the operation of the 2-way set associative cache and the direct map cache may be conventional and may not be affected by the RAMset cache 126. Other cache techniques could also be used in place of the 2-way cache 124.

Figure 12:
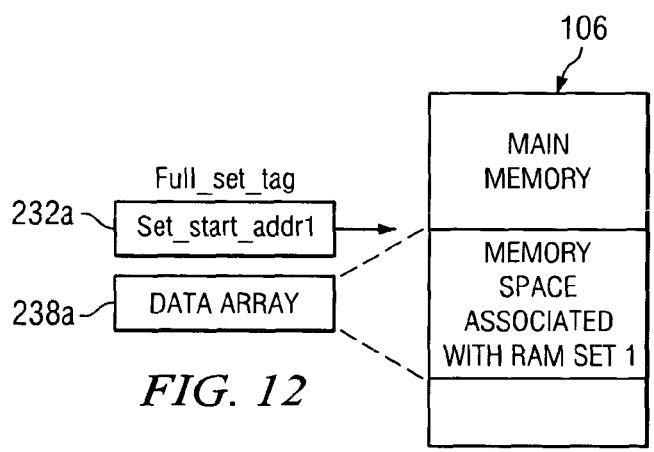
FIG. 12 illustrates the mapping of the cache's data array to main memory.

The RAMset cache 126 preferably stores a contiguous block of main memory 106 starting at an address defined by the Full_set_tag register 232 for the RAMset. This contiguous block of information (e.g., local variables/pointers) may be mapped to the corresponding data array 238 of the RAMset. In at least some embodiments, only the high order bits of the starting address are stored in the Full_set_tag register 232. FIG. 12 illustrates this mapping for a single RAMset. As shown, the content of Full_set_tag register 232a defines the starting address for a contiguous block of memory cached in data array 238a.

Referring again to FIG. 11, a RAMset miss may occur when the high order bits of the address from the core 120 do not match the contents of the Full_set_TAG register 232 or the global valid bit is "0". In either case, when a RAMset miss occurs, the data storage 122 may behave like conventional, 2-way cache logic. As such, if there is a hit in the 2-way associative cache, then data is presented to the core 120 from the 2-way set associative cache. Otherwise, the data is retrieved from main memory 106, forwarded to the core and loaded into a "victim" entry of the two-way associative cache.

A RAMset hit situation may occur when the high order bits of the address from the core 120 match the contents of the Full_set_TAG register 232 and the global valid bit equals "1" (the setting of the global valid bit is described in greater detail below). By default, the RAMset comparison preferably has higher priority than the other cache ways. A hit situation indicates that the requested data is mapped into the RAMset. If the Valid entry bit 237 corresponding to the line containing the data is set to "1", comparator 240 causes hit/miss logic 246 to generate a "hit-hit" signal because the address hit the RAMset and the data is present in the RAMset. If the corresponding valid bit 237 of the RAMset entry is "0", logic 240 generates a "hit-miss" because the address hit the RAM set, but the data is not yet present in the RAM set. In this latter case, the data may be fetched from main memory 106 and loaded into the data array 238 of the RAMset. A hit in the RAMset logic preferably takes precedence over the normal cache logic. The standard logic of the 2-way cache generates a miss when the RAMset logic generates a hit. Information can reside in both the RAMset and the 2-way cache without causing any misbehavior; the duplicated cache entry in the 2-way cache will eventually be evicted by the replacement mechanism of the two-way cache because such data will not be used. When configured as a RAMset, data array 238 a, b, c can be configured as a local RAM or as a cached segment depending on the setting of a suitable configuration bit. However, even when configured as a local RAM, individual valid bits may be updated and misses do not generate accesses to the external memory.

To configure a RAMset for operation, the Full_set_tag register 232 preferably is loaded with a start address (set_start_addr) and the RAM_fill_mode bit 224 is configured to a desired fill mode. The circuitry for filling the cache can be the same as that used to fill lines of the set associative cache. At least one fill mode may be implemented and is referred to as a "line-by-line" fill mode as described below. Other fill modes may be implemented if desired such as the "set fill" mode described in at least one of the documents incorporated by reference.

For the line-by-line fill (RAM_fill_mode=0), the global valid bit 34 is set to "1" when the Full_set_tag register 232 is loaded with the starting address. Each of the valid entry bits 237 is set to "0" simultaneously or substantially simultaneously to the programming of the Full_set_register, or independently. At this point, the data array 238 is empty (it is assumed that the Cache_Enable bit 226 is set to "1" to allow operation of the data storage 122). Upon receiving an address from the core 120, a valid entry bit 237 is selected based on the low order bits of the address. As provided above, if the RAMset is 16 Kbytes in size, organized as an array of 1K×16 bytes, where 16 bytes is equivalent to a block line in the associated 2-way cache, the Full_set_TAG register 232 may store 18 bits [31:14] of the starting address (set_start_addr). The address indexing each entry of the RAMset (ADDR[L]) may include 10 bits [13:4] while the data address used to access one data value in the line may include 4 bits [3:0] (assuming data accesses are 1 byte). A line of the data array 238 (at ADDR [L]) is loaded from main memory 106 each time that a hit-miss situation occurs because (1) the comparator 240 determines a match between ADDR[H] and Set_start_addr, (2) the Global valid bit 34 is set to "1" and (3) the valid bit 237 associated with the line at ADDR[L] is "0". This situation indicates that the selected line is mapped to the RAMset, but has not yet been loaded into the RAMset's data array 238. When the line is loaded into the data array 238 from main memory 106, the valid bit 237 corresponding to the line is set to "1".

This loading procedure (resulting in the valid bit being set to indicate the presence of valid data) has the same time penalty as a normal cache line load, but the entry will remain locked in the RAMset (i.e., the valid bit will remain set) and, therefore, the processing device will not be penalized on a subsequent access. As such, the lines used by a completed method remain valid so that re-using the lines by subsequent methods does not necessitate accesses to main memory 106. Further, freeing the local variable space for a completed method generally only involves disregarding the relevant base pointer. Further still, there is no need to copy back local variables upon to main memory 106 upon completion of a method because such extinct local variables are not used any more.

Upon completion of a method, the lines containing that method's local variables may remain marked as valid. As noted above, maintaining such lines marked as valid avoids generating misses in calls of new methods.

While the preferred embodiments of the present invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above. Each and every claim is incorporated into the specification as an embodiment of the present invention.

What is claimed is:

1. A system, comprising:
   a first processor;
   a second processor coupled to the first processor, the second processor having a core and comprising stack storage residing in the core;
   memory coupled to, and shared by, the first and second processors; and
   a synchronization unit coupled to the first and second processors, said synchronization unit synchronizes the execution of the first and second processors;
   wherein the second processor executes stack-based instructions while the first processor executes one or more tasks wherein the first processor manages the memory via an operating system that executes only on the first processor and the first processor executes a virtual machine that controls the execution of a program on the second processor;
   wherein the first processor executes a transaction targeting a pre-determined address and the synchronization unit detects said predetermined address and, as a result of detecting the pre-determined address, asserts a wait signal to cause said first processor to enter a reduced power or reduced performance mode; and
   wherein said second processor asserts a wait release signal that is received by said synchronization unit and that causes said synchronization unit to deassert said wait signal to the first processor.

2. The system of claim 1 wherein the second processor comprises an internal data memory that holds a contiguous block of memory defined by an address stored in a register, and wherein local variables are stored in said data memory.

3. The system of claim 1 wherein the stack-based instructions comprise Java bytecodes and the first processor comprises a RISC processor so that the RISC processor executes one or more tasks while the second processor executes Java code.

4. The system of claim 1 further including a main stack residing outside the second processor's core and coupled to the stack storage in the second processor's core.

5. The system of claim 4 wherein the stack storage in the second processor's core provides an operand to execute a stack-based instruction in the second processor.

6. The system of claim 1 wherein a clock internal to the first processor is disabled thereby effectuating the reduced power or reduced performance mode.

7. The system of claim 1 wherein said wait signal remains asserted until said synchronization unit deasserts said wait signal.

8. The system of claim 1 wherein said second processor asserts said wait release signal when said second processor requires support from said first processor.

9. A method, comprising:
   synchronizing the execution of first and second processors, the second processor having a core and comprising stack storage residing in the core, wherein synchronizing comprises detecting that the first processor is executing a transaction targeting a pre-determined address and, as a result of detecting that the pre-determined address is being targeted, asserting a wait signal to cause said first processor to enter a reduced power or reduced performance mode and synchronizing further comprises the second processor causing the wait signal to be de-asserted to terminate the first processor's reduced power or reduced performance mode;
   executing stack-based instructions in the second processor while the first processor executes one or more tasks;
   executing an operating system on the first processor and not on the second processor;
   executing a virtual machine on the first processor that controls the execution of a program on the second processor; and
   the first processor managing memory accessible to both the first and second processors via the operating system.

10. The method of claim 9 further including storing local variables in an internal data memory in the second processor, the internal data memory configured to store a contiguous block of memory defined by an address stored in a register.

11. The method of claim 10 further comprising providing a main stack residing outside the second processor's core and providing an operand from the stack storage in the second processor's core and executing a stack-based instruction in the second processor using the operand.

12. A system, comprising:
    a first processor;
    a second processor coupled to the first processor, the, second processor having a core and comprising stack storage residing in the core and having an internal data memory that holds a contiguous block of memory defined by an address stored in a register, and wherein local variables are stored in said data memory;

memory coupled to, and shared by, the first and second processors; and a synchronization unit coupled to the first and second processors, wherein, based on a detection of a transaction to a predetermined address, said synchronization unit asserts a first signal to the first processor to cause the first processor to cease executing instructions and said synchronization unit receives a second signal from the second processor which thereby causes the synchronization unit to deassert the first signal;

wherein the second processor executes stack-based instructions while the first processor executes one or more tasks wherein the first processor manages the memory via an operating system that executes only on the first processor and the first processor executes a virtual machine that controls the execution of a program on the second processor.

13. The system of claim 12 wherein said synchronization unit continues to assert said first signal until the synchronization unit either the synchronization unit receives said second signal from the second processor or the synchronization unit receives an interrupt signal.

14. The system of claim 12 wherein said second processor asserts said second signal when said second processor requires support from said first processor.

\* \* \* \* \*